United States Patent [19]
Bengtsson

[11] Patent Number: 5,187,354
[45] Date of Patent: Feb. 16, 1993

[54] HAND SCANNER FOR READING BAR CODES AND DEACTIVATING ARTICLE SURVEILLANCE TAGS

[75] Inventor: Kjell Bengtsson, Bålsta, Sweden

[73] Assignee: Esselte Meto Eas Int. AB, Bromma, Sweden

[21] Appl. No.: 670,430

[22] Filed: Mar. 18, 1991

[30] Foreign Application Priority Data

Mar. 20, 1990 [SE] Sweden ................ 9001003

[51] Int. Cl.⁵ .................... G06K 7/10; H01F 13/00
[52] U.S. Cl. .................... 235/472; 335/284; 340/572
[58] Field of Search .......... 340/568, 571, 572; 235/379, 380, 462, 472; 335/284

[56] References Cited

U.S. PATENT DOCUMENTS

| | | | |
|---|---|---|---|
| 4,499,444 | 2/1985 | Heltemes et al. | 335/284 |
| 4,743,890 | 5/1988 | Hilzinger et al. | 340/551 |
| 4,818,847 | 4/1989 | Hara et al. | 235/455 |
| 4,929,928 | 5/1990 | Hultåker | 340/572 |
| 5,059,951 | 10/1991 | Kaltner | 340/572 |

FOREIGN PATENT DOCUMENTS

| | | | |
|---|---|---|---|
| 0112493 | 4/1984 | European Pat. Off. | |
| 3508369 | 11/1986 | Fed. Rep. of Germany | |
| 85/02285 | 5/1985 | World Int. Prop. O. | 340/572 |
| 90/05968 | 5/1990 | World Int. Prop. O. | 340/572 |

Primary Examiner—John W. Shepperd
Assistant Examiner—Edward Sikorski
Attorney, Agent, or Firm—Sixbey, Friedman, Leedom & Ferguson

[57] ABSTRACT

A hand scanner intended for optically reading a bar code on an item of goods and therewith produce an electric signal which corresponds to the read bar code. The invention is characterized in that the hand scanner (1) is provided with one or more permanent magnets (3, 4) in the vicinity of its optical bar-code reading device.

6 Claims, 2 Drawing Sheets

HAND SCANNER FOR READING BAR CODES AND DEACTIVATING ARTICLE SURVEILLANCE TAGS

FIELD OF THE INVENTION

The present invention relates to a hand-held scanner for reading bar codes applied on items of goods.

BACKGROUND OF THE INVENTION

It has become more usual to provide items of goods offered for sale in self-service stores with a bar code which is read-off at the cash desk of the store, thereby to record automatically the price of said item, among other things. One alternative in this regard is the use of a so-called hand-scanner, i.e. a scanner which is held by the cashier and passed over the bar code on the goods item concerned, said scanner reading the bard code optically and delivering to a computer or microprocessor an electric signal which corresponds to the information contained in the bar code.

It has also become progressively more usual in recent times to provide price-tagged goods with a magnetic alarm strip in conjunction with the price tags, said strips being intended to coact with transmitter coils and receiver coils positioned in the vicinity of the cash desk or an exit, so that if a customer fails to present an item of goods for payment, an alarm signals is triggered when the goods item is passed between the coils.

In order to prevent the triggering of an alarm by goods which have been paid for, the alarm strip on the price tag is deactivated by exposing the strip to a powerful permanent magnetic field. At present, this is effected by holding the price tag close to a fixedly mounted permanent magnet. This method necessitates the cashier first to pass the goods past the scanner with the bar code on the goods facing towards the scanner and then to move the price tag on the goods against the permanent magnet. Thus, the cashier is required to perform two different procedural steps, namely one step involving recording the item of goods by reading the bar code and another step involving deactivation of the alarm strip.

SUMMARY OF THE INVENTION

The present invention relates to a device which enables these two procedures to be carried out in only one single procedural step. The present invention provides a considerable improvement, when seen against the background of the very large number of good items handled by a cashier at the cash desk.

Thus, the present invention relates to a hand scanner which is intended to read optically a bar code located on an item of goods and therewith produce an electric signal which corresponds to the bar code read by the scanner, and is characterized in that said hand scanner is provided with one or more permanent magnets in the proximity of its optical reading means.

BRIEF DESCRIPTION OF THE DRAWINGS

The invention will now be described in more detail with reference to an exemplifying embodiment thereof illustrated in the accompanying drawings, in which.

DETAILED DESCRIPTION OF THE PREFERRED EMBODIMENT

Figure 1:
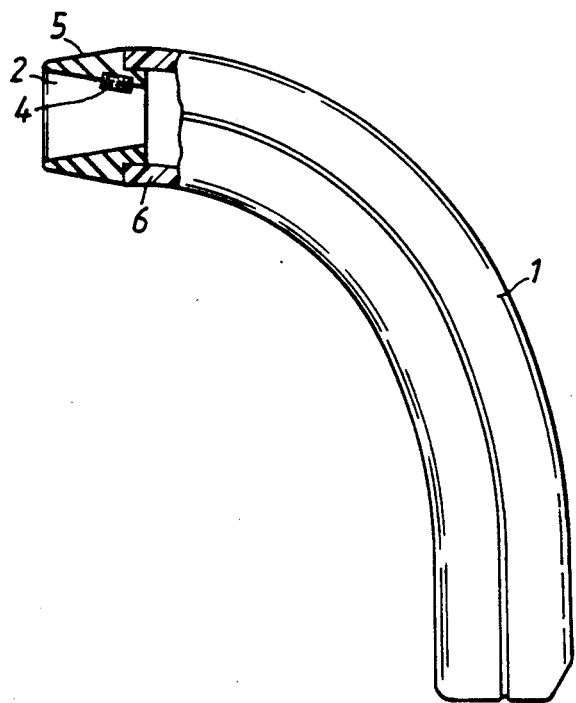
FIG. 1 is a side view of an inventive hand scanner, with the front part shown in cross-section.
Figure 2:
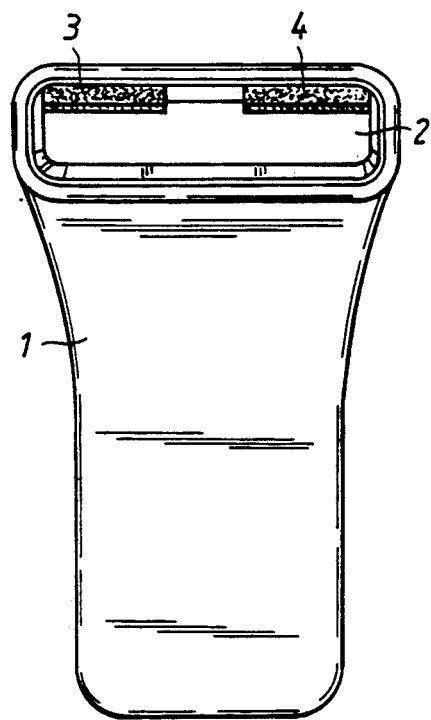
FIG. 2 is a front view of an inventive hand scanner.

FIGS. 1 and 2 illustrate a hand scanner 1 intended for optically reading a bar code on an item of goods and therewith provide an electric signal which corresponds to the bar code read by the scanner. Such hand scanners are known and are general in commerce, primarily in general stores. One type of hand scanner, namely the hand scanner illustrated in the Figures, is configured with an outwardly projecting, rectangular opening 2 and includes a known optical bar-code reading device (not shown) which is located inwardly of said opening. The opening 2 is at least equally as large as the dimensions of the bar code to be read. When reading-off a bar code, the scanner opening is positioned over the bar code and the code is read without moving the scanner.

In accordance with the invention, the aforesaid hand scanner is provided with one or more permanent magnets 3, 4 in the vicinity of the optical bar-code reading device.

According to one preferred embodiment, said magnet or magnets 3, 4 are disposed in the opening 2. A conventional type of hand scanner is provided with a rubber cuff or sleeve 5 which is fitted onto the plastic casing 6 of the scanner. In the case of this type of scanner it is suitable to attach the magnets between the rubber cuff and the plastic casing. Magnets which are positioned in the manner shown in FIG. 1 will not interfere with the cashier's handling of the scanner.

When the scanner is moved to a position above/over the bar code, the alarm strip on the price tag will be deactivated by means of the permanent magnet or magnets 3, 4, in that the magnetic field from the magnet or magnets will magnetize magnetic sections on the alarm strip, so that the alarm strip will no longer transmit intermodulation products of sufficient strength to be detected when the alarm strip is exposed to a magnetic alternating field having at least two frequencies.

Depending on its, or their, position the magnet or magnets will produce a permanent magnetic field having a given field pattern which is more or less advantageous for the purpose in question.

According to a preferred embodiment, one or more pairs of permanent magnets are provided. In the illustrated embodiment, one pair of permanent magnets 3, 4 is provided. In this case, the magnets of each pair of magnets are placed adjacent one another in a plane which is substantially parallel to the plane in which the bar code is located when read-off. This plane is perpendicular to the plane of the paper in FIG. 1. Furthermore, the south pole of a first magnet 4 is located on a magnet surface which faces away from the scanner, while the north pole is located on a surface which faces in towards the scanner. The respective south and north poles of the other magnet 3 of said pair face in opposite directions thereto, said FIGS. 2 and 3 in which the south poles and north poles are referenced S and N respectively. This positioning produces a powerful magnetic field in front of the scanner opening.

Figure 3:
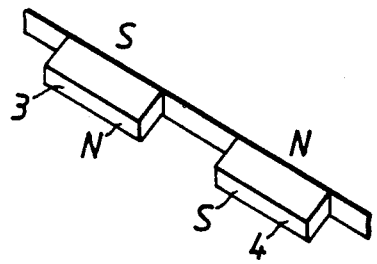
FIG. 3 illustrates magnets in perspective and in larger scale.

As will be understood, several pairs of magnets can be placed adjacent one another in the manner illustrated in FIG. 3.

In order for a hand scanner of the present kind to provide the effect intended, it is necessary that the price tag or label provided with an alarm strip is positioned close to or in the immediate vicinity of the bar code on said item of goods. This presents no problem, however, since the person who price-marks the goods can be instructed to place the price tags in the immediate vicinity of the bar code. If a price tag is placed too far away from the bar code, it suffices for the cashier to move the hand scanner to the price tag so as to deactivate the alarm strip.

Figure 4:
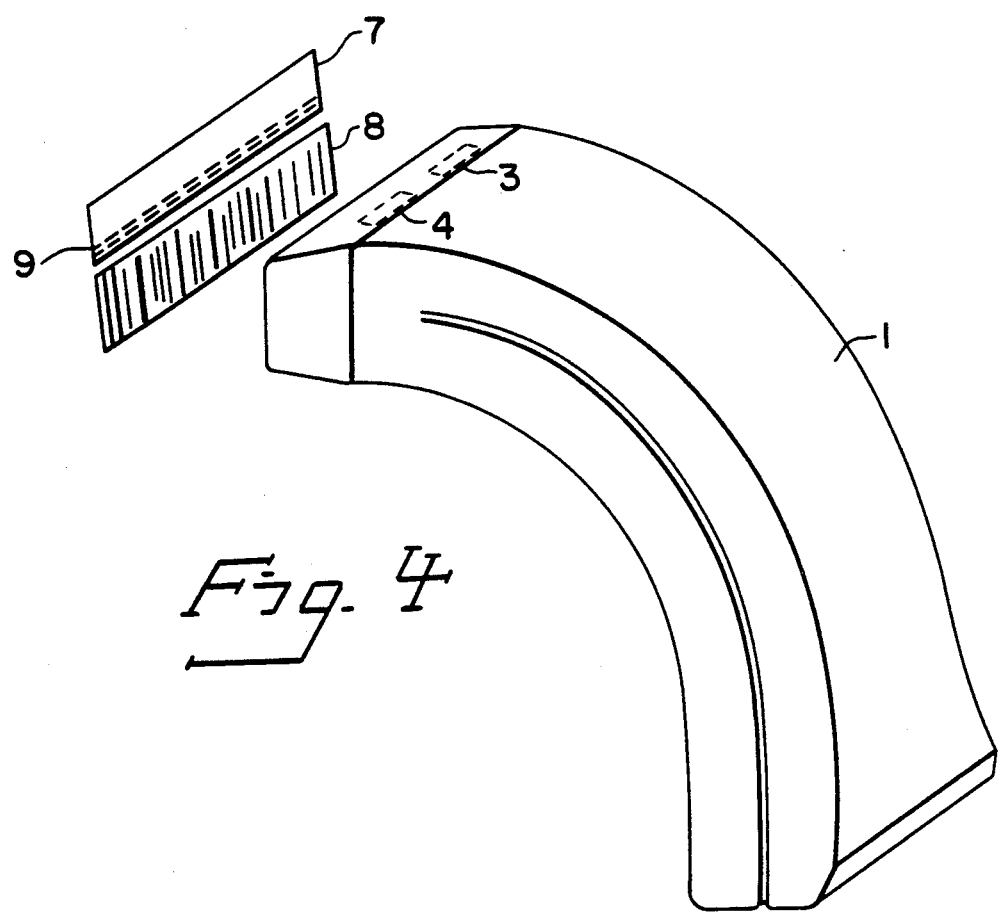
FIG. 4 is a perspective view of a scanner according to the present invention, showing a bar code and a price tag with a alarm strip located for reading and deactivation by the scanner.

FIG. 4 shows the scanner 1 positioned to read a bar code 8. As described previously, a price tag or label 7 provided with an alarm strip 9 is positioned proximate to bar code 8 so as that magnets 3 and 4 will magnetize magnetic sections on the alarm strip 9 while bar code 8 is read.

The invention has been described above with reference to one type of hand scanner. The invention can also be applied, however, with so-called pen-readers of the kind which are drawn along the bar code. In this case, a pair of magnets can be placed on opposite sides of the tip of the pen reader, for instance.

It is evident that the present invention will overcome the drawbacks mentioned in the introduction, since the price tag is deactivated when reading the bar code. This obviates one of the steps earlier required of the cashier, while eliminating, at the same time, the risk of an alarm being triggered by an item of goods for which payment has been made, due to the cashier forgetting to deactivate the price tag. An alarm which is triggered by mistake in this way is experienced as being highly troublesome by the customers involved.

The invention has been described in the aforegoing with reference to various embodiments. It will be understood, however, that modifications can be made by the skilled person, so as to adapt these embodiments to different types of hand scanners, pen readers or the like.

The invention is therefore not restricted to the aforedescribed embodiments, since modifications and variations can be made within the scope of the following claims.

I claim:

1. A hand scanner for optically reading a bar code located on an item, the item further having a magnetically actuated alarm strip attached thereto proximate said bar code and substantially parallel to the length of said bar code, comprising:

an optical bar-code reading device located in a housing so as to read said bar code through an opening in said housing, and which produces an electrical signal corresponding to said bar code when said opening is positioned over the bar code without moving of the scanner, wherein said scanner is provided with at least one pair of permanent magnets for imposing magnetization on said alarm strip, each said pair comprising first and second magnets mounted proximate said opening such that the south pole of said first magnet is located on a magnet surface which faces in a first direction toward said bar code during scanning and the south pole of said second magnet faces in a direction opposite to said first direction, whereby said first and second magnets produce a magnetic field in front of said opening and between said magnets to produce a sectional magnetization of said alarm strip during reading of the bar code.

2. A hand scanner according to claim 1, wherein two or more of said pairs of permanent magnets are used, with the magnets of each pair of magnets positioned adjacent one another in a plane which is substantially parallel to the plane in which the bar code is located when being read.

3. A hand scanner according to claims 1 or 2 wherein said opening in the scanner is substantially rectangular.

4. A hand scanner for optically reading a bar code on an item comprising:

an optical bar-code reading device located in a housing so as to read a bar code through an opening in said housing, and which produces an electrical signal corresponding to said bar code when said opening is positioned over the bar code without moving of the scanner;

wherein said scanner is provided with at least one pair of permanent magnets for changing a magnetization of a security device on the item, each said pair comprising first and second magnets mounted proximate said opening such that the south pole of said first magnet is located on a magnet surface which faces in a first direction toward said bar code during scanning and the south pole of said second magnet faces in a direction opposite to said first direction; and wherein a flexible cuff is fitted on a collar at the periphery of said opening and said magnets are attached to said cuff inwardly from an open end of the cuff distant from said collar.

5. A hand scanner according to claim 4, wherein two or more of said pairs of permanent magnets are used, with the magnets of each pair of magnets positioned adjacent one another in a plane which is substantially parallel to the plane in which the bar code is located when being read.

6. A hand scanner according to claims 4 or 5 wherein said opening in the scanner is substantially rectangular.

* * * * *